United States Patent [19]

Jostein

[11] Patent Number: 5,702,130
[45] Date of Patent: Dec. 30, 1997

[54] FLUID FLOW CONNECTOR

[75] Inventor: Erstad Jostein, Bergen, Norway

[73] Assignee: Framo Engineering AS, Nesttun, Norway

[21] Appl. No.: 558,449

[22] Filed: Nov. 16, 1995

[30] Foreign Application Priority Data

Nov. 1, 1995 [GB] United Kingdom ............... 9522325

[51] Int. Cl.⁶ ........................................ F16L 17/035
[52] U.S. Cl. ..................... 285/96; 285/134; 285/106; 285/900
[58] Field of Search ........................ 285/95, 96, 131, 285/134, 136, 106, 900

[56] References Cited

U.S. PATENT DOCUMENTS

| | | | |
|---|---|---|---|
| 4,111,467 | 9/1978 | de Fremery | 285/136 |
| 4,126,336 | 11/1978 | Ortloff et al. | 285/136 |
| 4,561,679 | 12/1985 | Choate | 285/95 |
| 4,602,806 | 7/1986 | Saliger | 285/136 X |
| 4,647,076 | 3/1987 | Pollack et al. | 285/95 |
| 4,662,657 | 5/1987 | Harvey et al. | 285/96 |
| 4,669,758 | 6/1987 | Feller et al. | 285/134 X |
| 4,683,912 | 8/1987 | Dubrosky | 285/134 X |
| 4,741,402 | 5/1988 | Smith | 285/131 X |
| 4,781,404 | 11/1988 | Tharp et al. | 285/136 X |
| 4,819,966 | 4/1989 | Gibb | 285/18 |

FOREIGN PATENT DOCUMENTS 2 562 201  10/1985  France.

*Primary Examiner*—Terry Lee Melius
*Assistant Examiner*—Heather Shackelford
*Attorney, Agent, or Firm*—Foley & Lardner

[57] ABSTRACT

An evaporative cooling system externally mounted around an air cooled condenser to increase the rate of heat transfer. Spray cooling takes place in stages around succeeding portions of the condenser as determined by thermostats which respond to increasing condenser air discharge temperature.

10 Claims, 6 Drawing Sheets

FLUID FLOW CONNECTOR

This application claims the benefit of U.S. provisional application Ser. No. 60/000,135, filed Jun. 12, 1995, a copy of which is attached.

BACKGROUND OF THE INVENTION

This invention relates to an externally mounted attachment to spray water on the condenser of an air conditioning unit to increase the rate of heat transfer. Residential air conditioning condensing units are designed and rated to operate at 95° F. dry bulb. When the ambient temperature approaches and rises above this level, cooling capacity drops, power consumption increases, and the compressor is forced to operate in its uppermost stressful design range.

It is well known to employ evaporative cooling to lower the temperature of the air passing through the condenser. In this manner, the condensing unit can be made to operate more efficiently with only a modest increase in the cost of water.

The techniques of spraying water on an air cooled condenser are as old as air conditioning itself. As applied to residential air conditioning, numerous patents have been issued disclosing systems to achieve this result. U.S. Pat. No. 4,028,906 shows a nozzle 30 medially mounted above the condenser to supply a fan-shaped curtain of finely atomized water across the face of the condenser. U.S. Pat. No. 4,240,265 shows a nozzle 18 supported by wire hooks looped over the condenser tubing. A temperature sensor 60 turns the spray on an off. U.S. Pat. No. 4,672,817 shows a perforated tube 46 surrounded by wicking material 48 mounted on the upper periphery of a condenser. Water supplied to the tube wets the wicking material which allows for a controlled wetting of the condenser. U.S. Pat. No. 5,285,651 shows a manifold conduit 25 on the upper part of the condenser for supplying water to a series of spray nozzles 27.

Despite the existence of a large body of art directed to this technology and its acknowledged benefits, commercial usage has been minimal. There are three main reasons causing this unfavorable acceptance: (1) blocking of the condenser by minerals left behind by the evaporating water; (2) system imbalance caused by poor control of evaporative cooling under conditions of low wet bulb and dry bulb ambient air; and (3) excessive water usage and wetting of the area surrounding the condensing unit. These problems have been addressed in a novel manner by the disclosed invention.

SUMMARY OF THE INVENTION

The overall object of the present invention is to provide an externally mounted water spraying system automatically controlled by thermostats and solenoid valves to spray water on the condenser. Spraying is applied in stages with each stage acting on a separate portion of the condenser under control of its own thermostat. In this manner, more precise control of the condensing unit operating pressures are obtained along with better control of water usage.

It is another object of the invention to manage condenser fouling by selecting a lead stage where fouling is most likely to occur and placing a velocity sensor behind it to signal condenser fouling.

It is another object of the invention to control the spray angle and spacings of the nozzles to reduce condenser fouling.

It is yet another object of the invention to arrange a plurality of sealed snap-acting bimetal discs around the condenser internally of the condensing unit to operate the fluid control solenoid valves.

BRIEF DESCRIPTION OF THE DRAWINGS

FIG. 7 is a perspective view of a spray nozzle.

DESCRIPTION OF PREFERRED EMBODIMENTS

Figure 1:
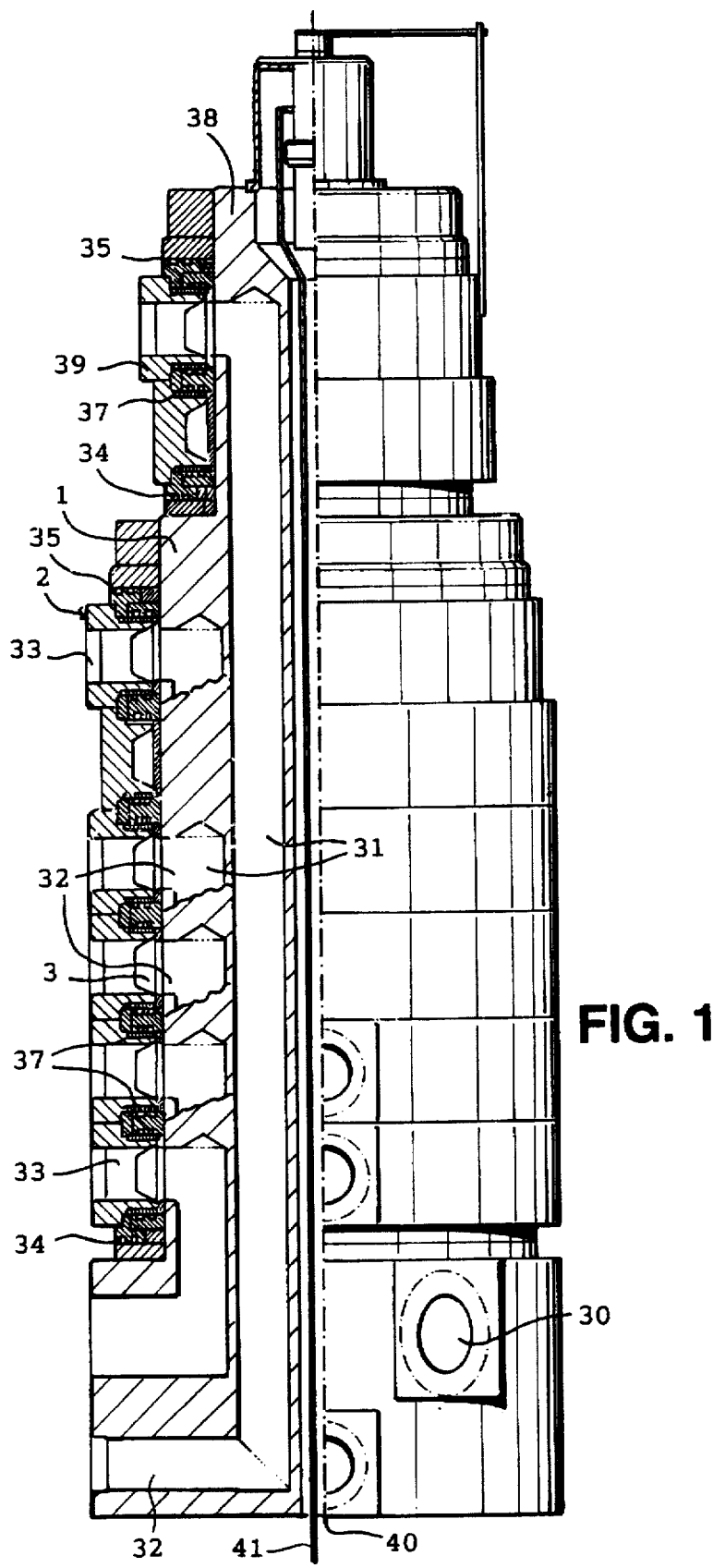
FIG. 1 is a perspective view showing the spray system installed on a condensing unit.
Figure 2:
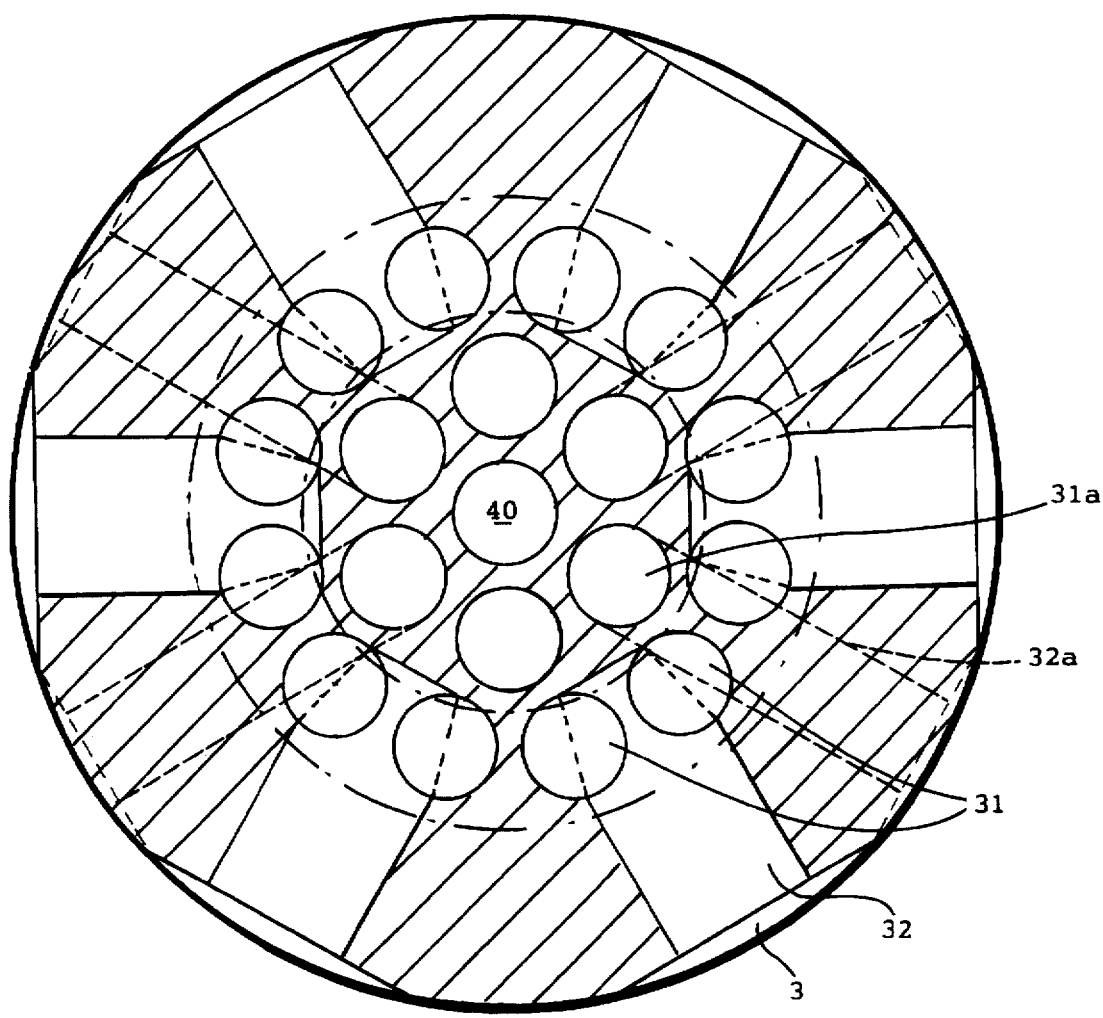
FIG. 2 is a partly schematic top plan view of FIG. 1.
Figure 3:
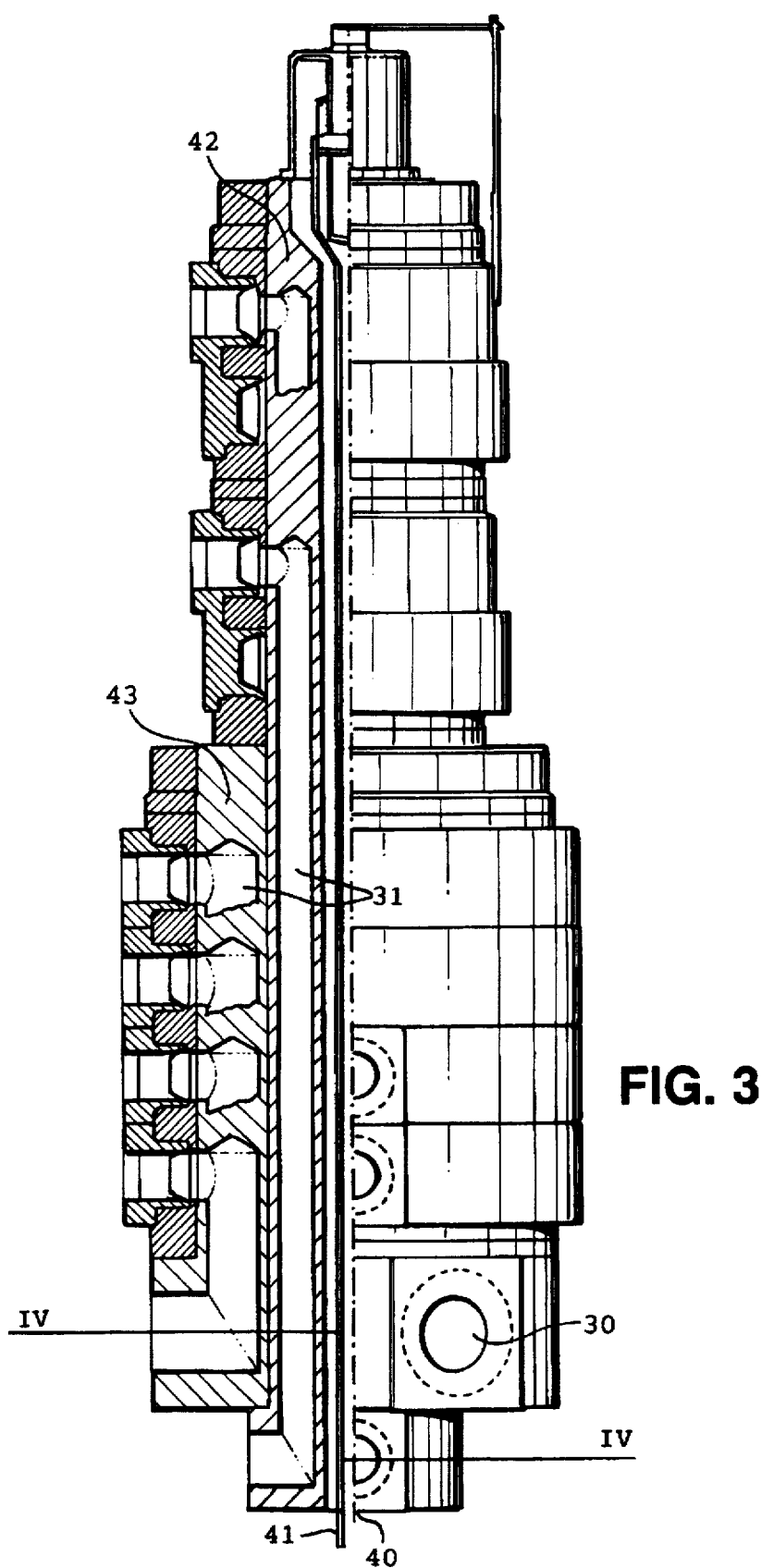
FIG. 3 is a schematic drawing of the piping and electrical circuit of the preferred embodiment.

Referring now in general to the drawings and in particular to FIGS. 1–3, the novel spray system 10 of the invention is shown installed around a condensing unit 11. The condensing unit is of the style having a U-shaped wrap-around condenser 12 with a top mounted condenser fan 13 to draw air through the condenser and discharge it vertically. A grille 14 surrounds the condenser to protect the fins from damage.

While the invention is described with respect to a condensing unit with a U-shaped wraparound condenser, it should be clearly understood that the invention can be applied to condensing units having circular, rectangular and square shapes.

A U-shaped manifold 15 is installed around the base of the condensing unit and is secured thereto by fasteners, not shown. The manifold may be formed of copper tubing and sweat fittings or of plastic tubing such as PVC used in the plumbing trades. Because of its low cost, durability, and ease of assembly with a quick drying adhesive and a wide range of fittings, PVC tubing having a ⅞" OD and ¾" ID is preferred. The manifold has an inlet 16 supplied with water from any convenient service such as a high pressure garden hose 17. A manual shutoff valve 18 is added for maintenance purposes. As an optional feature, a mineral filter 19 may be installed at the inlet when conditions warrant its use.

A number of tee fittings 20 are provided in the manifold 15 at substantially equally spaced intervals to roughly demarcate the condenser into approximately equal sections. A vertical tube 21 is secured in the stem of each tee to overlie the condenser from bottom to top. The open branch of the tee at the manifold end is capped off. Each vertical tube carries spaced nozzles 22 which direct a spray toward the condenser. The vertical tubes, here shown as eight in number, are divided into four spray stages numbered A, B, C and D in FIGS. 3 and 4. Stage A closest to the inlet is designated as the lead stage.

Manifold 15 is supplied with a number of electrically operated solenoid valves 23 in series flow relationship. A solenoid valve is installed at the inlet of each stage and is accordingly designated 23A, 23B, 23C and 23D on the drawings. When solenoid valve 23A is energized, stage A is activated to spray water on its specific section of the condenser while stages B, C and D remain inactive. When stage B is activated along with stage A, the condenser sections opposite stages A and B are sprayed with water and so forth down the line with stages C and D.

The solenoid valves 23 are under control of designated thermostats 24 which are accordingly numbered 24A, 24B, 24C and 24D on the drawings. The thermostats 24, schematically shown in FIG. 3, are of the bimetal disc type. These thermostats are commercially available from Kidde-Fenwal Inc. of Ashland, Mass., and are briefly described in FIG. 4 which shows a thermostat with normally open contacts 25 movable to a closed position by bimetal disc 26. The switch is sealed in a protective housing. These thermostats are provided with fixed closing and opening temperature settings. In the particular application shown on the drawings, the thermostat settings were selected as follows:

24A—close at 90° and open at 80° F.

24B—close at 100° and open at 90° F.

24C—close at 110° and open at 100° F.

24D—close at 120° and open at 110° F.

Thermostats 24A-24B are mounted internally of the condensing unit opposite their respective stages. The thermostats are mounted about ⅓ of the way down the condenser to respond to an average air temperature reading. They are supported in spaced relation on the condenser to sense air temperature rather than condenser fin surface temperature. Any suitable hook around the condenser tubing or a clip secured to the condenser fins may be employed to support the thermostats.

Referring now to FIG. 3, the electrical circuit of the invention will be described. In conventional fashion, a room thermostat 27, when calling for cooling, energizes the operating coil of contactor 28 from a 24V transformer 29. Power is then supplied to compressor 30 along with fan 13 (FIG. 2). A 24V power transformer 31 having a 24V secondary and 240V primary is connected to the load side of contactor 28 to be energized along with compressor 30. Solenoid valves 23A-23D, along with their associated thermostats 24A-24D, are wired in parallel across legs 32 of 24V power transformer 31. Closure of the contacts in thermostats 24A-24D energizes the associated solenoid valve 23A-23D.

As an optional feature, a circuit may be added to signal that the condenser needs cleaning. A conventional sail switch 33 and signal lamp 34 are wired across the 24V secondary of power transformer 31. Sail switch 33 is a conventional component placed within air ducts to sense air velocity. It includes a thin switch operating membrane placed in the airstream. When the air velocity drops to a predetermined level, the switch contacts are closed energizing signal lamp 34. Sail switch 33 is preferably placed internally of the condensing unit opposed to stage A which is most likely to be the first stage to be obstructed with mineral deposits.

A step-by-step operational description of the preferred embodiment will now be given. Assume a hot summer day when the temperature in the morning is about 85° F. and gradually rises until it peaks out at 98° F. in the late afternoon and then begins to decline back to 85° F. and below at night. Starting in the morning with the thermostat set at 75° F., contactor 28 will be energized supplying power to compressor 30. At the same time, transformer 31 and lines 32 will supply power to thermostats 24A-24D and solenoids 23A-23D. Since ambient air is already 85° F. and the heat rejected by the condenser will be at least 10 degrees above that, thermostat 24A will close energizing solenoid 23A. Water will then flow through manual valve 18, filter 19, into manifold pipe 15, through opened valve 23A into vertical pipes 21 of stage A and through nozzles 22 onto the condenser portion opposite stage A. As the ambient temperature continues to rise to the peak level of 98° F. in the late afternoon, stages B, C and D will be successively added. After the peak temperature hours have passed, the reverse will take place with stages D, C and B shutting down, leaving only stage A. If the temperature continues to fall during the night, stage A will shut down returning operation to normal unconditioned ambient air.

From the above, it can be seen that lead stage A will be in operation more than the other stages, and if any condenser fouling occurs, it will occur at this location first. That is why the sail switch 33 is placed behind stage A. There is ample time to take corrective action since the condensing unit will operate on the remaining stages.

Figure 5:
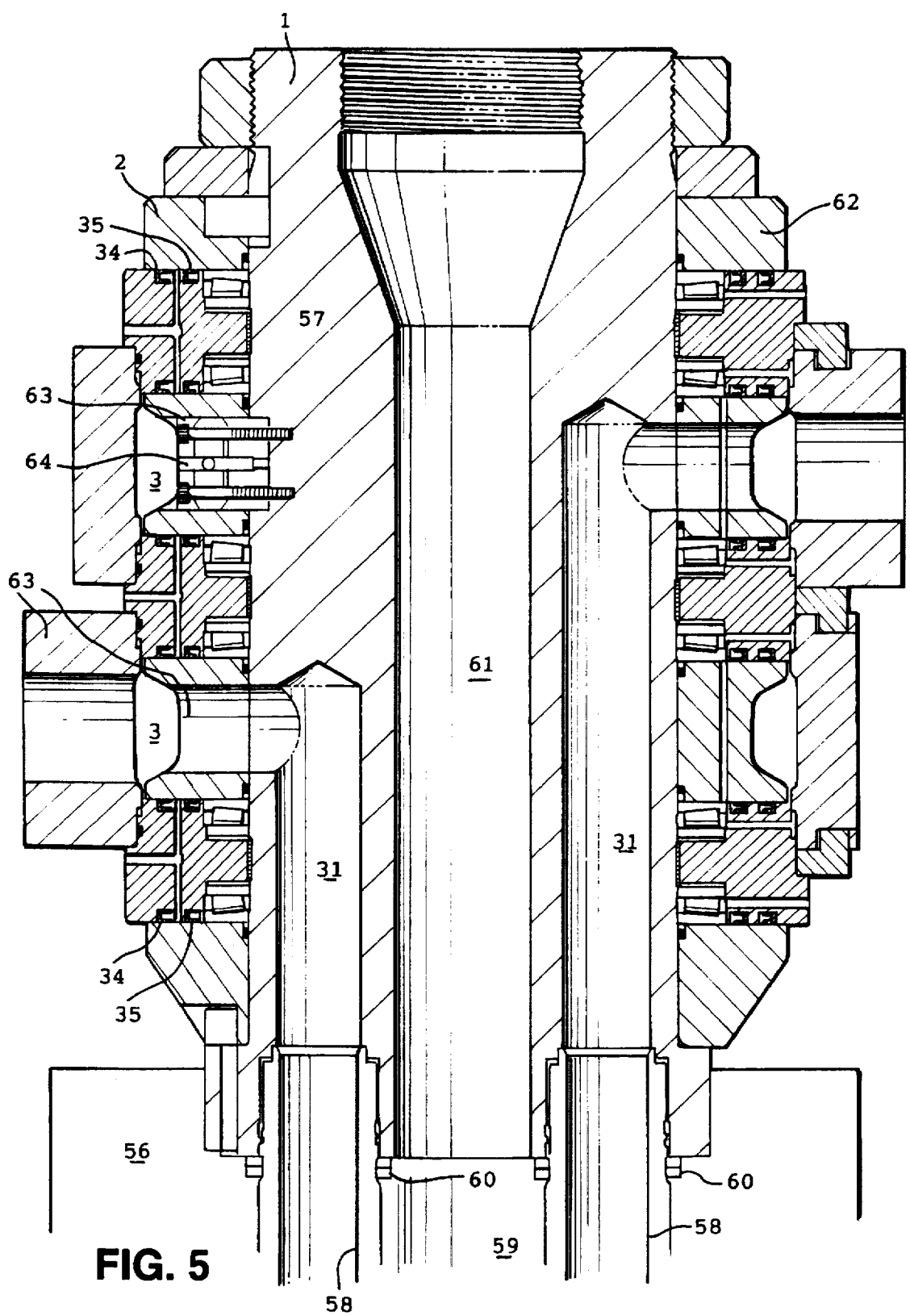
FIG. 5 is a circuit for a separately wired sensing unit to initiate spray system operation.

FIG. 5 shows a modification of the invention wherein the manifold 15 is fed by the water inlet 17 at a medial portion instead of one end. Since the components in FIG. 5 are the same as in FIGS. 1-3 (only the locations have been changed), the same reference numerals will be used. The advantages in the FIG. 5 embodiment is that the system flexibility can be increased because there are two inlet stages, namely A and C which may be interchanged by appropriate wiring connections to thermostats 24A and 24C.

Figure 6:
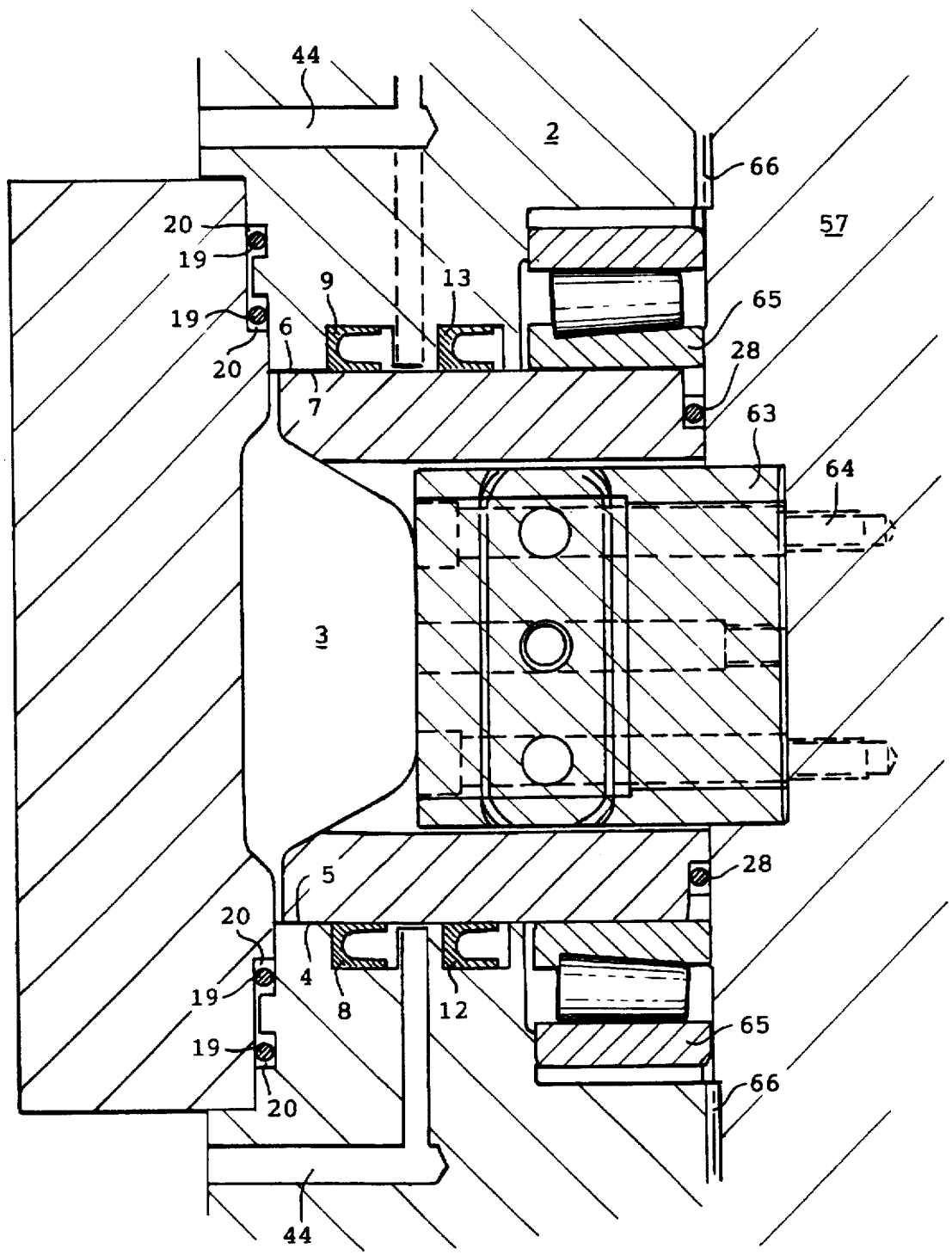
FIG. 6 is a side elevation sectional view of the snap-acting disc thermostats.

FIG. 6 shows a separate circuit to supply 24 volts to the spray system instead of tapping into the load side of contactor 28, as shown in FIG. 3. In FIG. 6, a separate 24 volt transformer 35 has a primary connected to a line source of voltage which may be 120V or 240V. The 24 volt output is connected to a commercially available sensor 36 which, when activated, closes a circuit to the 24 volt load devices comprising the solenoids 24. The sensor may be activated by vibration, sound, air flow, or motion detection.

The disclosed system employs a commercially available nozzle, as shown at 37 in FIG. 7. This nozzle is equipped with an internal strainer. It was determined through experimentation that for a 3 ton condensing unit, a nozzle having a flow rate of 0.6 gph with a fine mist projected at an angle of 70-75 degrees performed well. Each vertical pipe was equipped with two of these nozzles. Also, for reasons not completely understood by applicants, it was determined that the angle at which the spray mist strikes the condenser fins has an effect upon the rate of mineral deposit.

It is not intended to limit the present invention to the details of illustration or terms of description of the preferred embodiments shown above. It should be clearly understood that the invention can be applied to a wide range of condensing units with different sizes and shapes of condensers. The number of stages, the number of vertical tubes in each stage, the number and flow characteristics of the nozzles, and the temperature settings of the thermostats are all design parameters practiced within the scope of the invention to fit particular needs.

We claim:

1. In an outdoor air conditioning condensing unit having a wraparound condenser and a top mounted fan to draw ambient air through the condenser in combination with an externally mounted evaporative cooling system to spray water on the condenser to increase the rate of heat transfer, said evaporative cooling system comprising a tubular manifold encircling the base of the condensing unit coextensive with the wraparound condenser, said manifold having an inlet connected to a source of water pressure, a plurality of vertically extending pipes in fluid communication with said manifold and spaced along the manifold to overlie the condenser for its peripheral extent, each vertical pipe being provided with at least one spray nozzle, said vertical pipes being divided into a number of spray stages with each spray stage comprising at least one vertical pipe, an electrically controlled solenoid valve mounted in fluid control relationship in said manifold at the inlet of each said spray stages, a plurality of thermal switches arranged around the condenser internally of the condensing unit at locations to sense the temperature of the air leaving the condenser at the respective spray stage locations, each thermal switch being set at a different but increasing temperature setting, each thermal switch being electrically connected with a manifold solenoid valve associated with its respective spray stage whereby a modulated spray pattern is generated across said condenser as a function of condenser discharge air temperature.

2. The combination of claim 1 wherein the water pressure inlet is connected to one end of the manifold and the solenoid valves are connected in series flow relationship.

3. The combination of claim 1 wherein the water pressure inlet is connected to the manifold to divide it into two separate branches.

4. The combination of claim 2 wherein each spray stage and its associated inlet solenoid valve counting downstream away from the water pressure inlet are sequentially energized in accordance with an increasing temperature program as determined by the setting of the thermal switches.

5. The combination of claim 3 wherein each spray stage and its associated inlet solenoid valve counting downstream away from the water pressure inlet of each branch are sequentially energized in accordance with an increasing temperature program as determined by the setting of the thermal switches.

6. The combination of claim 1 wherein a sail switch is mounted within the condensing unit on the opposite side of the condenser from the spray stage operative at the lowest temperature setting to close a circuit to a signalling device when the condenser is partially blocked.

7. The combination of claim 1 including a contactor for supplying power to the compressor when energized, a stepdown transformer having a 24 volt secondary for supplying power to the electrical components of the evaporative cooling system, the primary of the transformer being wired in parallel with the compressor whereby said evaporative cooling system is operative whenever the compressor is energized.

8. The combination of claim 1 including a stepdown transformer having a primary winding connected to a source of AC power and a 24V secondary connected to a sensing device, said sensing device being operative to sense a physical signal resulting from the operation of the condensing unit, said sensing device, when activated, supplies 24 volts to the load devices in the evaporative cooling system.

9. The combination of claim 1 wherein said thermal switches comprise a snap-acting bimetal disc sealed in a protective housing.

10. A method of increasing the efficiency of an outdoor air conditioning condensing unit having a wraparound condenser and a top mounted fan to draw ambient air through the condenser, said method comprising installing a tubular manifold encircling the condensing unit coextensive with the wraparound condenser, connecting said manifold to a source of water pressure, installing a plurality of spaced vertically extending pipes in fluid communication with said manifold along the length thereof, providing each vertically extending pipe with at least one spray nozzle, grouping said vertically extending pipes into a number of spray stages comprising at least one vertical pipe, providing an electrically controlled valve in said manifold at the inlet of each spray stage, providing a plurality of thermal switches arranged around the condenser internally of the condensing unit, each switch being set out at a different operating temperature, connecting said switches in circuit with individual electrically controlled valves whereby a modulated spray pattern is directed toward the condenser depending upon the settings of said switches.

* * * * *

UNITED STATES PATENT AND TRADEMARK OFFICE
CERTIFICATE OF CORRECTION

PATENT NO.   : 5,702,130
DATED        : December 30, 1997
INVENTOR(S)  : Erstad

It is certified that error appears in the above-identified patent and that said Letters Patent is hereby corrected as shown below:

Title page,
Should be deleted to appear as per attached title page.

Please delete drawing sheets 1-6 and substitute drawing sheets 1-6 as per attached.

Signed and Sealed this

Eighteenth Day of September, 2001

*Attest:*

*Nicholas P. Godici*

*Attesting Officer*

NICHOLAS P. GODICI
*Acting Director of the United States Patent and Trademark Office*

(12) United States Patent
Erstad

(10) Patent No.: US 5,702,130 B1
(45) Date of Patent: Dec. 30, 1997

(54) FLUID FLOW CONNECTOR

(75) Inventor: Jostein Erstad, Bergen (NO)

(73) Assignee: Framo Engineering AS, Nesttun (NO)

(*) Notice: Subject to any disclaimer, the term of this patent is extended or adjusted under 35 U.S.C. 154(b) by 0 days.

(21) Appl. No.: 08/558,449

(22) Filed: Nov. 16, 1995

(30) Foreign Application Priority Data

Nov. 1, 1995 (GB) .................................. 9522325

(51) Int. Cl.$^6$ ................................................. F16L 17/035
(52) U.S. Cl. ........................ 285/96; 285/134; 285/106; 285/900
(58) Field of Search .................... 285/95, 96, 131, 285/134, 136, 106, 900

(56) References Cited

U.S. PATENT DOCUMENTS

| 4,111,467 | 9/1978 | de Fremery | 285/136 |
|---|---|---|---|
| 4,126,336 | * 11/1978 | Ortloff et al. | 285/136 |
| 4,561,679 | 12/1985 | Choate | 285/95 |
| 4,602,806 | * 7/1986 | Saliger | 285/136 X |
| 4,647,076 | * 3/1987 | Pollack et al. | 285/95 |
| 4,662,657 | * 5/1987 | Harvey et al. | 285/96 |
| 4,669,758 | * 6/1987 | Feller et al. | 285/134 X |
| 4,683,912 | * 8/1987 | Dubrosky | 285/134 X |
| 4,741,402 | * 5/1988 | Smith | 285/131 X |
| 4,781,404 | * 11/1988 | Tharp et al. | 285/136 X |
| 4,819,966 | 4/1989 | Gibb | 285/18 |

FOREIGN PATENT DOCUMENTS 2 562 201  10/1985  (FR).

* cited by examiner

Primary Examiner—Terry Lee Melius
Assistant Examiner—Heather Shackelford
(74) Attorney, Agent, or Firm—Foley & Lardner

(57) ABSTRACT

A fluid flow connector for connecting conduits carrying high pressure production fluid, the arrangement comprising a first member carrying a connecting end of the one of the conduits, a second member carrying a connecting end of the other of the conduits, the first and the second members being movable relative to each other, wherein the first connecting member has: a central core with a plurality of bores formed longitudinally therein; and a plurality of passages formed radially of the core, each radial passage communicating with a respect longitudinal bore, a plurality of annular channels formed between the connecting members, each annular channel providing a fluid flow path to a respective radial passage in the central core, and means for sealing the or each annular channel against leakage of the high pressure production fluid, wherein the sealing means includes: a sealing member activated by differential pressure, and means for supplying a barrier fluid to the side of the sealing member which is remote from the production fluid flow. The connector has considerable advantages over the prior art as it is versatile and more reliable than known connectors.

10 Claims, 6 Drawing Sheets

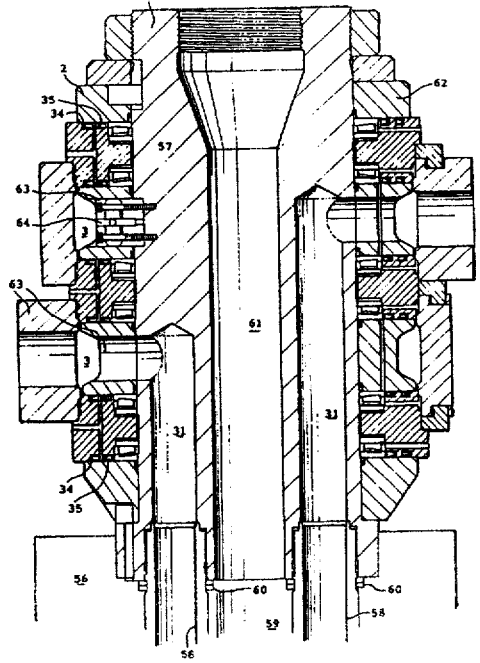

FLUID FLOW CONNECTOR

FIELD OF THE INVENTION

The present invention relates to a fluid flow connector, particularly for high pressure applications.

Such connectors are needed for example in transferring oil or gas from offshore drilling installations onto transport or storage vessels.

The connectors may be a part of floating buoys carrying a riser from an undersea extraction point to which an oil tanker links up to load the oil or gas. Alternatively the connector may be fixed on the deck of the transport vessel. It is also possible for one part of the connector to be normally carried on the vessel and to be releasably connected at appropriate times to the other part in the floating buoy.

Relative movement between the parts of the connector is important for such applications to allow for relative movement of the vessel and the riser in strong winds, high waves or influential currents.

A relative rotational capability is particularly advantageous and the connector may form a swivel joint between conduits. Of course such a swivel joint presents difficulties with regard to ensuring correct and accurate alignment of the ends of corresponding fluid conduits and in sealing the conduit junction against leakage.

Reference to Copending Applications

Reference is hereby made to applicant's own copending applications covering related subject matter the content of which is incorporated herein by reference:

US application claiming priority from UK application 9522326.9, filed Nov. 1, 1995 entitled "Sealing Arrangement" Ser. No. 08/559,356, pending.

US application claiming priority from UK application 9522327.7 filed Nov. 1, 1995 entitled "High Pressure Fluid Connector" Ser. No. 08/559,581, pending.

US application claiming priority from UK application 9522340.0 filed Nov. 1, 1995 entitled "Monitoring System for High Pressure Fluid Flow Connector" Ser. No. 08/558,512, pending.

BACKGROUND OF THE INVENTION

One fluid flow connector is known from U.S. Pat. No. 4,828,292 and comprises two concentric hollow cylindrical parts, relatively rotatable with respect to each other and having cooperating aligned annular channels to form circumferential passages within the connector, delimited by the inner walls of the two cylindrical parts. Inlet and outlet pipes are welded to the inner or outer cylindrical parts as appropriate and connect with the annular circumferential passages. In this way, even with rotational movement of the two parts, the inlet and outlet pipes communicate at all times via the annular passages. Annular ring seals are incorporated on each side of the passages and may be pressurised by a barrier fluid.

However, this known design is difficult and expensive to manufacture with sufficiently accurate tolerances, the welded joints are often prone to failure particularly under the high pressures and in the dirty environment of oil and gas production facilities, and it is a permanent structure once manufactured i.e. it cannot easily be connected and disconnected even for routine maintenance and repair.

It is an object of the invention to provide an arrangement for connecting conduits, which is more versatile and reliable than known connectors.

SUMMARY OF THE INVENTION

Accordingly the present invention provides a connecting arrangement for conduits carrying high pressure production fluid, the arrangement comprising:
- a first member carrying a connecting end of one of the conduits,
- a second member carrying a connecting end of the other of the conduits, the first and the second members being movable relative to each other,
- wherein the first connecting member has:
  - a central core with a plurality of bores formed longitudinally therein; and
  - a plurality of passages formed radially of the core, each radial passage communicating with a respective longitudinal bore,
  - a plurality of annular channels defined by facing surfaces of the connecting members, each annular channel providing a fluid flow path to a respective radial passage in the central core,
  - and means for sealing the or each annular channel against leakage of the high pressure production fluid,
- wherein the sealing means includes:
  - a sealing member activated by differential pressure, and
  - means for supplying a barrier fluid to the side of the sealing member which is remote from the production fluid flow.

An arrangement according to the invention is more versatile and more reliable than known connectors.

Preferably one side of the sealing member is subject to the pressure of the high pressure production fluid flowing in the conduits and the other side of the seal is subject to the barrier fluid which is supplied at a higher pressure than that of the production fluid flowing in the conduits.

In a preferred embodiment additional environment seals are provided in the region of the top and bottom of the central core.

The longitudinal bores may be formed in a ring in the core and two such bores can be fluidly connected to each radial passage.

The arrangement preferably uses a sealing arrangement as described and illustrated in applicant's co-pending simultaneously filed US application deriving from UK application No. 9522326.9 entitled "Sealing Arrangement" and bearing the reference FD37/PL77262GB.

A particularly preferred embodiment of the present invention provides an inner and an outer core element having independent bores formed in respective core elements, the inner element extending longitudinally beyond the outer core element and connecting with a second female connecting member of a smaller diameter to the first female connecting member for the outer core.

This improves the capacity of the connector to carry many different fluids simultaneously and independently since it provides the possibility to provide a larger number of bores in the central core. Also bores of different diameters for different fluid flows can be made more easily. Smaller diameter bores are generally used for higher pressure fluid conduits.

Another embodiment of the present invention provides a large diameter lower male connector and a small diameter upper male connector which can be stacked onto the large diameter connector. The lower, large diameter connector has a hollow central section though which pipes are inserted to connect with the bores in the upper, small diameter, connector. This embodiment saves material, and is thus less expensive. Male connectors of different diameters can easily

BRIEF DESCRIPTION OF THE DRAWINGS

FIG. 1 shows one embodiment of a fluid connector according to the present invention in cross-sectional and in elevational view.

FIG. 2 is a cross section through the fluid connector of FIG. 1 illustrating one example of an arrangement of bores in the central core.

FIG. 3 is a part cross-sectional view of a second embodiment of a fluid connector according to the present invention.

Figure 4:
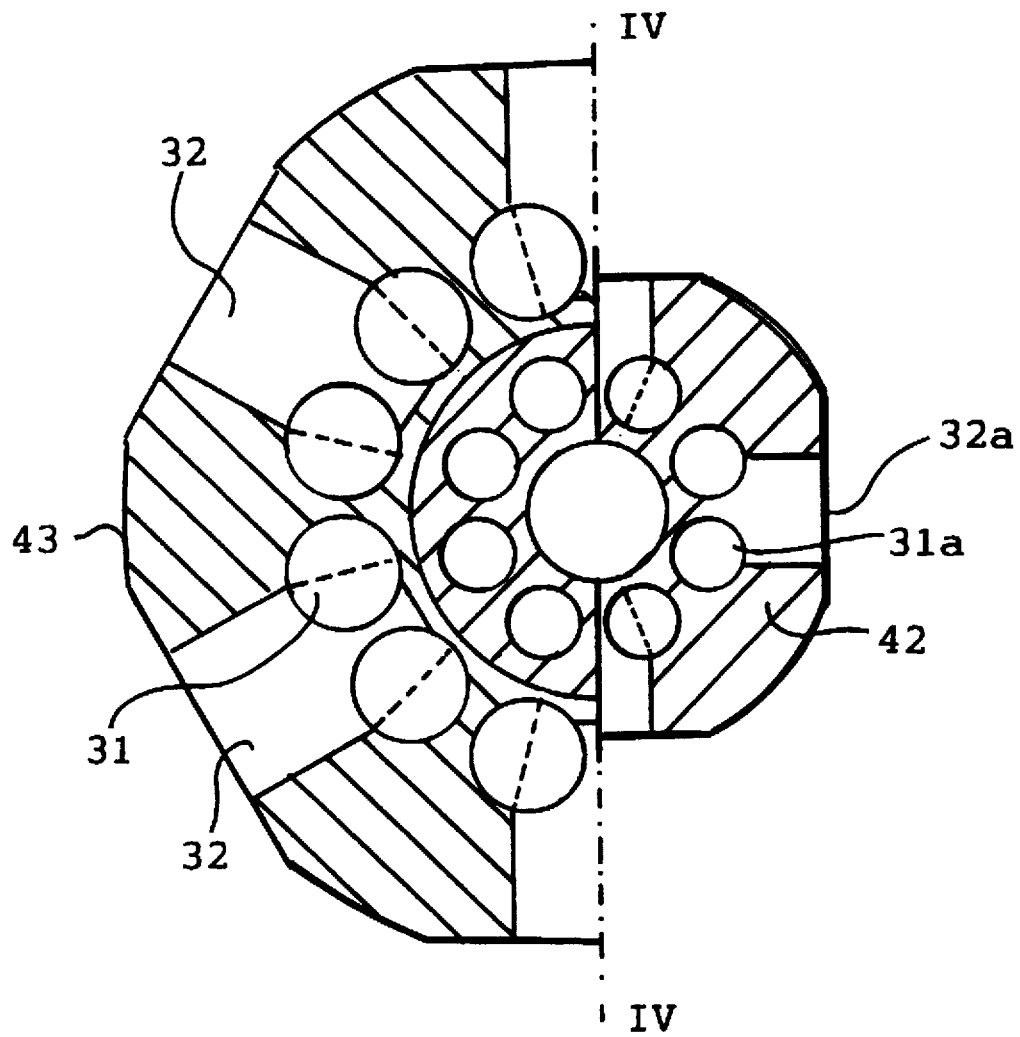
FIG. 4 is a schematic drawing of an embodiment showing a parallel flow arrangement.

FIG. 4 is a cross-section through the fluid connector of FIG. 3 along line IV—IV.

FIG. 5 is a cross-sectional view of a third embodiment of a fluid connector according to the present invention.

FIG. 6 is an enlarged view of part of FIG. 5.

DETAILED DESCRIPTION

FIG. 1 illustrates a high pressure fluid connector. In the left half of the Figure a cross-sectional view is shown. In the cross-sectional view, oppositely directed cross-hatching is used to indicate parts of the connector which are relatively rotational with respect to each other. Thus a male member 1 is denoted by a left to right rising cross-hatching and a female member 2 is denoted by left to right falling cross-hatching. The male member 1 is generally held stationary, for example on a storage or transport vessel to which the oil or gas is being pumped through the connector.

The male core member 1 has several axial bores 31 connecting radial passageways 32 in core element 1 to fluid conduits 33 in the female member 2. The junction of these fluid conduits with the radial passageways 32 in male member 1 is formed as annular grooves 3. In this way the relative rotation of the two members 1 and 2 does not affect the fluid connection between the two.

This junction of the fluid conduits and the passageways is sealed by means of over-pressure double sealing arrangements above and below each junction, coaxial with the annual grooves. These sealing arrangements are indicated generally at 37 and are described in more detail in applicant's co-pending and simultaneously filed British Application No. 9522326.9 entitled "Sealing Arrangement".

Such a sealing arrangement comprises double pairs of lip-seals each having U-shaped cross-sections and being activated by a high pressure barrier fluid applied to the open side of the sealing ring. The barrier fluid is supplied at a higher pressure to the pressure of the production fluid in the conduit and provides a lubrication for the seal, to facilitate relative rotation of the members 1 and 2 without damage to the seal.

Such a sealing arrangement is provided above and below each annular groove 3.

At the top and bottom of the fluid connector is provided an environment seal 34, 35 which seals a set of fluid carrying conduits against the environment (which will usually but not necessarily exclusively be at atmospheric pressure). Again the environment seal comprises a pair of spaced U-shaped seals activated by pressure differentials.

In the embodiment shown in FIG. 1 the core element 1 comprises an additional extension portion 38 extending longitudinally above female member 2, and having a smaller diameter. This extension 38 connects with a second female member 39 in the same way as has been described in relation to the first female member 2 and the main part of the core member 1. That is to say that sealing arrangements 37 as well as environment seal 34, 35 are provided. Such a narrower diameter core extension is useful for particularly high pressure fluid flow.

In a further embodiment described later with reference to FIG. 3, the core extension 38 may be formed as a separate inner core element which fits coaxially into the outer core element 1.

FIG. 2 is a cross-section of FIG. 1 showing axially bores 31 arranged in concentric rings.

The outer ring of bores 31 connect two at a time to radial passageways 32.

An inner ring of axial bores 31a each connect a respective radial passageway 32a. These are denoted by broken lines to indicate that they are not in the plane of view of FIG. 2.

A central axial bore 40 in core 1 carries electrical wires 41 (FIG. 1) and/or other support lines and power supplies for the connector and the pipeline.

FIG. 3 shows an alternative arrangement to that of FIG. 1 where the arrangement is identical except that the male core member 1 is formed of an inner core member 42 and an outer core member 43. All other components are denoted by like reference numbers. Using a male core member which is sectioned in this way is advantageous since it allows for easier manufacture of the connector.

FIG. 4 is a cross-section along line IV—IV in FIG. 3. This clearly shows the axial conduits 31 in the outer core 43 communicating in pairs with radial passageways 32.

The inner core member 42 has axial bores 31a of a smaller diameter to those in the outer core element. These bores 31a communicate for fluid connection in pairs with radial passageways 32a. Each set of axial bores is arranged in a ring.

The central bore 40 is provided to carry power supply lines or other services.

FIG. 5 shows a lower, large diameter male connector 56 with an upper small diameter connector 57 stacked on top, each having a hollow central portion 59.

Each of these male connectors (56,57) has longitudinal bores for fluid transport which connect with respective radial passageways, annular grooves and conduits in co-operating female members, as has been described with reference to the FIGS. 1 and 3 above. The bores and passageways of lower connector 56 are not shown in FIG. 5. The bores 31 of the upper connector 57 connect to pipes 58 which are located in the hollow central part 59 of lower connector 56. Seals 60 are arranged at the junction of bores 31 and pipes 58 and these may be of any of a variety of known constructions.

The upper connector 57 also has a hollow central part 61. The upper and lower connectors 56,57 each have a solid core surrounding their hollow centres, through which the longitudinal bores are drilled for transport of fluid.

The upper and lower male connectors each have separate co-operating female connectors. In FIG. 5 the lower female connector is not shown but the upper one is indicated at 62.

The junction of the fluid carrying conduits between the male and female parts is sealed in a similar way to the system described for the embodiments of FIGS. 1 and 3, and is also described in applicant's co-pending and simultaneously filed application entitled "Sealing Arrangement" deriving from UK application 9522326.9(FD37, PL77262GB). However, in FIG. 5, a different arrangement of the parts is used and this is illustrated in larger scale in FIG. 6 which is a cross-section through a part of one fluid conduit junction.

The arrangement of parts at this junction will now be described in detail with reference to FIGS. 5 and 6.

The annular grooves 3 in the embodiment of FIG. 5 are formed between the female member 2 and key pieces 63 which are bolted to the core of male member 57 by bolts 64. This makes the male member 57 simpler to construct and the tolerances required for the fluid conduits are easier to achieve in these smaller individual parts.

Above and below each annular groove is a double sealing arrangement each comprising a primary 8,9 and a secondary 12,13 sealing ring in respective grooves. The sealing rings are lip seals with U-shaped cross-sections. They are arranged with the open arms facing away from the fluid path defined by annular groove 3. In this embodiment this is radially inwardly of the connector in contrast to the arrangement of the embodiments described above where the arms face radially outwardly (but still away from the fluid path).

These sealing rings seal the production fluid against leakage in the clearance between relatively moveable surface 4,5 below the groove 3 and between surfaces 6 and 7 above. They are thus known as dynamic seals. They are activated by pressurised barrier fluid applied through channels 44 to the open side to create a pressure differential.

Roller bearings 65 are provided to assist the relative movement between surfaces 4 and 5 and between surfaces 6 and 7. Sliding or needle bearings 66 assist movement between facing vertical surfaces.

Static seals 28 comprising O-rings 19 and back-up plates 20 are also used in the connector as shown, but these are used between surfaces which have a fixed relationship to each other. These static seals may alternatively comprise U-shaped lip seals pressurised by barrier fluid supplied through drilled communication channels.

Environment seals 34,35 are arranged above and below each section of connector.

What I claim is:

1. A connecting arrangement for conduits carrying high pressure production fluid, the arrangement comprising:
    a first member carrying a connecting end of one of the conduits, and having an outwardly facing surface,
    a second member arranged coaxially with and surrounding the first member and carrying a connecting end of another of the conduits, the second member having a surface facing the outwardly facing surface of the first member, the first and the second members being rotatable relative to each other,
    wherein the first connecting member has:
        a central core with a plurality of bores formed longitudinally therein,
        a plurality of passages formed radially of the core, each radial passage communicating with a respective longitudinal bore,
        a plurality of annular grooves on the outwardly facing surface, each annular groove providing a fluid flow path to a respective radial passage in the central core, and
    wherein the central core includes an inner and an outer core element concentrically arranged one with the other, the bores and radial passages of the first core element being independent, with respect to the flow of production fluid, from the bores and radial passages of the second core element,
    and wherein the second member has a plurality of corresponding annular grooves in its inwardly facing surface, respective pairs of the annular grooves in the first and second members forming fluid flow annular channels,
    and means for sealing the or each annular channel against leakage of the high pressure production fluid,
    wherein the sealing means includes:
        a U-shaped sealing member activated by differential pressure, and
        means for supplying a barrier fluid at a higher pressure than the production fluid to the side of the sealing member which is remote from the production fluid flow.

2. The arrangement of claim 1 further comprising additional environment seals located in the region of the top and bottom of the central core.

3. The arrangement of claim 1 wherein the longitudinal bores are formed in a ring concentrically within the core.

4. The arrangement of claim 1, wherein the inner core element extends longitudinally beyond the outer core element and two second connecting members having different diameters are provided to connect respectively with the inner and outer core elements.

5. The arrangement of claim 1 wherein the central core comprises stainless steel.

6. The arrangement of claim 1 wherein the central core has a hollow section extending axially therethrough.

7. The arrangement of claim 6 comprising:
    an additional first connecting member having a smaller diameter than that of the first connecting member and which is stacked therein so that the longitudinal bores of the additional first connecting member fluidly communicate with the hollow section of the first member.

8. The arrangement of claim 7 comprising a plurality of pipes in the hollow section which connect hydraulically to the bores of the additional first connecting member.

9. The arrangement of claim 6 comprising a plurality of first connecting members and co-operating second connecting members, of differing diameters, the members being stackable to be used together.

10. A connecting arrangement for conduits carrying high pressure production fluid, the arrangement comprising:
    a first member carrying a connecting end of one of the conduits, and having an outwardly facing surface,
    a second member carrying a connecting end of the other of the conduits, the second member having a surface facing the outwardly facing surface of the first member, the first and the second members being movable relative to each other,
    wherein the first connecting member has:
        a central core with a plurality of bores formed longitudinally therein; and
        a plurality of passages formed radially of the core, two of said longitudinal bores communicating with each of said radial passages,
        a plurality of annular channels defined by said facing surfaces of the connecting members, each annular channel providing a fluid flow path to a respective radial passage in the central core,
        and means for sealing the or each annular channel against leakage of the high pressure production fluid,
    wherein the sealing means includes:
        a sealing member activated by differential pressure, and
        means for supplying a barrier fluid to the side of the sealing member which is remote from the production fluid flow.

* * * * *

UNITED STATES PATENT AND TRADEMARK OFFICE
CERTIFICATE OF CORRECTION

PATENT NO. : 5,702,130
DATED : December 30, 1997
INVENTOR(S) : Erstad

It is certified that error appears in the above-identified patent and that said Letters Patent is hereby corrected as shown below:

Please delete the entire abstract, specification and claims and replace with the abstract, specification and claims at the time of allowance.

This certificate supersedes certificate of correction issued September 18, 2001.

Signed and Sealed this

Twenty-ninth Day of January, 2002

Attest:

JAMES E. ROGAN
*Director of the United States Patent and Trademark Office*

*Attesting Officer*

United States Patent
Erstad

(10) Patent No.: US 5,702,130 B1
(45) Date of Patent: Dec. 30, 1997

(54) FLUID FLOW CONNECTOR

(75) Inventor: Jostein Erstad, Bergen (NO)

(73) Assignee: Framo Engineering AS, Nesttun (NO)

(*) Notice: Subject to any disclaimer, the term of this patent is extended or adjusted under 35 U.S.C. 154(b) by 0 days.

(21) Appl. No.: 08/558,449

(22) Filed: Nov. 16, 1995

(30) Foreign Application Priority Data

Nov. 1, 1995 (GB) ............................. 9522325

(51) Int. Cl.⁶ ............................. F16L 17/035
(52) U.S. Cl. ............................. 285/96; 285/134; 285/106; 285/900
(58) Field of Search ............................. 285/95, 96, 131, 285/134, 136, 106, 900

(56) References Cited

U.S. PATENT DOCUMENTS

| | | | |
|---|---|---|---|
| 4,111,467 | 9/1978 | de Fremery | 285/136 |
| 4,126,336 * | 11/1978 | Orloff et al. | 285/136 |
| 4,561,679 | 12/1985 | Choate | 285/95 |
| 4,602,806 * | 7/1986 | Saliger | 285/136 X |
| 4,647,076 * | 3/1987 | Pollack et al. | 285/95 |
| 4,662,657 * | 5/1987 | Harvey et al. | 285/96 |
| 4,669,758 * | 6/1987 | Feller et al. | 285/134 X |
| 4,683,912 * | 8/1987 | Dubrosky | 285/134 X |
| 4,741,402 * | 5/1988 | Smith | 285/131 X |
| 4,781,404 * | 11/1988 | Tharp et al. | 285/136 X |
| 4,819,966 | 4/1989 | Gibb | 285/18 |

FOREIGN PATENT DOCUMENTS 2 562 201  10/1985 (FR).

* cited by examiner

Primary Examiner—Terry Lee Melius
Assistant Examiner—Heather Shackelford
(74) Attorney, Agent, or Firm—Foley & Lardner

(57) ABSTRACT

A fluid flow connector for connecting conduits carrying high pressure production fluid, the arrangement comprising a first member carrying a connecting end of the one of the conduits, a second member carrying a connecting end of the other of the conduits, the first and the second members being movable relative to each other, wherein the first connecting member has: a central core with a plurality of bores formed longitudinally therein; and a plurality of passages formed radially of the core, each radial passage communicating with a respect longitudinal bore, a plurality of annular channels formed between the connecting members, each annular channel providing a fluid flow path to a respective radial passage in the central core, and means for sealing the or each annular channel against leakage of the high pressure production fluid, wherein the sealing means includes: a sealing member activated by differential pressure, and means for supplying a barrier fluid to the side of the sealing member which is remote from the production fluid flow. The connector has considerable advantages over the prior art as it is versatile and more reliable than known connectors.

10 Claims, 6 Drawing Sheets

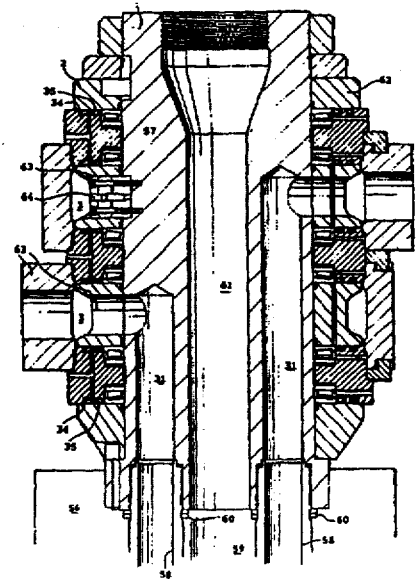

FLUID FLOW CONNECTOR

FIELD OF THE INVENTION

The present invention relates to a fluid flow connector, particularly for high pressure applications.

Such connectors are needed for example in transferring oil or gas from offshore drilling installations onto transport or storage vessels.

The connectors may be a part of floating buoys carrying a riser from an undersea extraction point to which an oil tanker links up to load the oil or gas. Alternatively the connector may be fixed on the deck of the transport vessel. It is also possible for one part of the connector to be normally carried on the vessel and to be releasably connected at appropriate times to the other part in the floating buoy.

Relative movement between the parts of the connector is important for such applications to allow for relative movement of the vessel and the riser in strong winds, high waves or influential currents.

A relative rotational capability is particularly advantageous and the connector may form a swivel joint between conduits. Of course such a swivel joint presents difficulties with regard to ensuring correct and accurate alignment of the ends of corresponding fluid conduits and in sealing the conduit junction against leakage.

Reference to Copending Applications

Reference is hereby made to applicant's own copending applications covering related subject matter the content of which is incorporated herein by reference:

US application claiming priority from UK application 9522326.9, filed Nov. 1, 1995 entitled "Sealing Arrangement" Ser. No. 08/559,356, pending.

US application claiming priority from UK application 9522327.7 filed Nov. 1, 1995 entitled "High Pressure Fluid Connector" Ser. No. 08/559,581, pending.

US application claiming priority from UK application 9522340.0 filed Nov. 1, 1995 entitled "Monitoring System for High Pressure Fluid Flow Connector" Ser. No. 08/558,512, pending.

BACKGROUND OF THE INVENTION

One fluid flow connector is known from U.S. Pat. No. 4,828,292 and comprises two concentric hollow cylindrical parts, relatively rotatable with respect to each other and having cooperating aligned annular channels to form circumferential passages within the connector, delimited by the inner walls of the two cylindrical parts. Inlet and outlet pipes are welded to the inner or outer cylindrical parts as appropriate and connect with the annular circumferential passages. In this way, even with rotational movement of the two parts, the inlet and outlet pipes communicate at all times via the annular passages. Annular ring seals are incorporated on each side of the passages and may be pressurised by a barrier fluid.

However, this known design is difficult and expensive to manufacture with sufficiently accurate tolerances, the welded joints are often prone to failure particularly under the high pressures and in the dirty environment of oil and gas production facilities, and it is a permanent structure once manufactured i.e. it cannot easily be connected and disconnected even for routine maintenance and repair.

It is an object of the invention to provide an arrangement for connecting conduits, which is more versatile and reliable than known connectors.

SUMMARY OF THE INVENTION

Accordingly the present invention provides a connecting arrangement for conduits carrying high pressure production fluid, the arrangement comprising:
- a first member carrying a connecting end of one of the conduits,
- a second member carrying a connecting end of the other of the conduits, the first and the second members being movable relative to each other,
- wherein the first connecting member has:
  - a central core with a plurality of bores formed longitudinally therein; and
  - a plurality of passages formed radially of the core, each radial passage communicating with a respective longitudinal bore,
  - a plurality of annular channels defined by facing surfaces of the connecting members, each annular channel providing a fluid flow path to a respective radial passage in the central core,
  - and means for sealing the or each annular channel against leakage of the high pressure production fluid,
- wherein the sealing means includes:
  - a sealing member activated by differential pressure, and
  - means for supplying a barrier fluid to the side of the sealing member which is remote from the production fluid flow.

An arrangement according to the invention is more versatile and more reliable than known connectors.

Preferably one side of the sealing member is subject to the pressure of the high pressure production fluid flowing in the conduits and the other side of the seal is subject to the barrier fluid which is supplied at a higher pressure than that of the production fluid flowing in the conduits.

In a preferred embodiment additional environment seals are provided in the region of the top and bottom of the central core.

The longitudinal bores may be formed in a ring in the core and two such bores can be fluidly connected to each radial passage.

The arrangement preferably uses a sealing arrangement as described and illustrated in applicant's co-pending simultaneously filed US application deriving from UK application No. 9522326.9 entitled "Sealing Arrangement" and bearing the reference FD37/PL77262GB.

A particularly preferred embodiment of the present invention provides an inner and an outer core element having independent bores formed in respective core elements, the inner element extending longitudinally beyond the outer core element and connecting with a second female connecting member of a smaller diameter to the first female connecting member for the outer core.

This improves the capacity of the connector to carry many different fluids simultaneously and independently since it provides the possibility to provide a larger number of bores in the central core. Also bores of different diameters for different fluid flows can be made more easily. Smaller diameter bores are generally used for higher pressure fluid conduits.

Another embodiment of the present invention provides a large diameter lower male connector and a small diameter upper male connector which can be stacked onto the large diameter connector. The lower, large diameter connector has a hollow central section though which pipes are inserted to connect with the bores in the upper, small diameter, connector. This embodiment saves material, and is thus less expensive. Male connectors of different diameters can easily be stacked on top of each other to provide a modularised design or the connectors can be used independently depending on the need of a particular project.

BRIEF DESCRIPTION OF THE DRAWINGS

FIG. 1 shows one embodiment of a fluid connector according to the present invention in cross-sectional and in elevational view.

FIG. 2 is a cross section through the fluid connector of FIG. 1 illustrating one example of an arrangement of bores in the central core.

FIG. 3 is a part cross-sectional view of a second embodiment of a fluid connector according to the present invention.

FIG. 4 is a cross-section through the fluid connector of FIG. 3 along line IV—IV.

FIG. 5 is a cross-sectional view of a third embodiment of a fluid connector according to the present invention.

FIG. 6 is an enlarged view of part of FIG. 5.

DETAILED DESCRIPTION

FIG. 1 illustrates a high pressure fluid connector. In the left half of the Figure a cross-sectional view is shown. In the cross-sectional view, oppositely directed cross-hatching is used to indicate parts of the connector which are relatively rotational with respect to each other. Thus a male member 1 is denoted by a left to right rising cross-hatching and a female member 2 is denoted by left to right falling cross-hatching. The male member 1 is generally held stationary, for example on a storage or transport vessel to which the oil or gas is being pumped through the connector.

The male core member 1 has several axial bores 31 connecting radial passageways 32 in core element 1 to fluid conduits 33 in the female member 2. The junction of these fluid conduits with the radial passageways 32 in male member 1 is formed as annular grooves 3. In this way the relative rotation of the two members 1 and 2 does not affect the fluid connection between the two.

This junction of the fluid conduits and the passageways is sealed by means of over-pressure double sealing arrangements above and below each junction, coaxial with the annular grooves. These sealing arrangements are indicated generally at 37 and are described in more detail in applicant's co-pending and simultaneously filed British Application No. 9522326.9 entitled "Sealing Arrangement".

Such a sealing arrangement comprises double pairs of lip-seals each having U-shaped cross-sections and being activated by a high pressure barrier fluid applied to the open side of the sealing ring. The barrier fluid is supplied at a higher pressure to the pressure of the production fluid in the conduit and provides a lubrication for the seal, to facilitate relative rotation of the members 1 and 2 without damage to the seal.

Such a sealing arrangement is provided above and below each annular groove 3.

At the top and bottom of the fluid connector is provided an environment seal 34, 35 which seals a set of fluid carrying conduits against the environment (which will usually but not necessarily exclusively be at atmospheric pressure). Again the environment seal comprises a pair of spaced U-shaped seals activated by pressure differentials.

In the embodiment shown in FIG. 1 the core element 1 comprises an additional extension portion 38 extending longitudinally above female member 2, and having a smaller diameter. This extension 38 connects with a second female member 39 in the same way as has been described in relation to the first female member 2 and the main part of the core member 1. That is to say that sealing arrangements 37 as well as environment seal 34, 35 are provided. Such a narrower diameter core extension is useful for particularly high pressure fluid flow.

In a further embodiment described later with reference to FIG. 3, the core extension 38 may be formed as a separate inner core element which fits coaxially into the outer core element 1.

FIG. 2 is a cross-section of FIG. 1 showing axially bores 31 arranged in concentric rings.

The outer ring of bores 31 connect two at a time to radial passageways 32.

An inner ring of axial bores 31a each connect a respective radial passageway 32a. These are denoted by broken lines to indicate that they are not in the plane of view of FIG. 2.

A central axial bore 40 in core 1 carries electrical wires 41 (FIG. 1) and/or other support lines and power supplies for the connector and the pipeline.

FIG. 3 shows an alternative arrangement to that of FIG. 1 where the arrangement is identical except that the male core member 1 is formed of an inner core member 42 and an outer core member 43. All other components are denoted by like reference numbers. Using a male core member which is sectioned in this way is advantageous since it allows for easier manufacture of the connector.

FIG. 4 is a cross-section along line IV—IV in FIG. 3. This clearly shows the axial conduits 31 in the outer core 43 communicating in pairs with radial passageways 32.

The inner core member 42 has axial bores 31a of a smaller diameter to those in the outer core element. These bores 31a communicate for fluid connection in pairs with radial passageways 32a. Each set of axial bores is arranged in a ring.

The central bore 40 is provided to carry power supply lines or other services.

FIG. 5 shows a lower, large diameter male connector 56 with an upper small diameter connector 57 stacked on top, each having a hollow central portion 59.

Each of these male connectors (56,57) has longitudinal bores for fluid transport which connect with respective radial passageways, annular grooves and conduits in co-operating female members, as has been described with reference to the FIGS. 1 and 3 above. The bores and passageways of lower connector 56 are not shown in FIG. 5. The bores 31 of the upper connector 57 connect to pipes 58 which are located in the hollow central part 59 of lower connector 56. Seals 60 are arranged at the junction of bores 31 and pipes 58 and these may be of any of a variety of known constructions.

The upper connector 57 also has a hollow central part 61. The upper and lower connectors 56,57 each have a solid core surrounding their hollow centres, through which the longitudinal bores are drilled for transport of fluid.

The upper and lower male connectors each have separate co-operating female connectors. In FIG. 5 the lower female connector is not shown but the upper one is indicated at 62.

The junction of the fluid carrying conduits between the male and female parts is sealed in a similar way to the system described for the embodiments of FIGS. 1 and 3, and is also described in applicant's co-pending and simultaneously filed application entitled "Sealing Arrangement" deriving from UK application 9522326.9(FD37, PL77262GB). However, in FIG. 5, a different arrangement of the parts is used and this is illustrated in larger scale in FIG. 6 which is a cross-section through a part of one fluid conduit junction.

The arrangement of parts at this junction will now be described in detail with reference to FIGS. 5 and 6.

The annular grooves 3 in the embodiment of FIG. 5 are formed between the female member 2 and key pieces 63 which are bolted to the core of male member 57 by bolts 64. This makes the male member 57 simpler to construct and the tolerances required for the fluid conduits are easier to achieve in these smaller individual parts.

Above and below each annular groove is a double sealing arrangement each comprising a primary 8,9 and a secondary 12,13 sealing ring in respective grooves. The sealing rings are lip seals with U-shaped cross-sections. They are arranged with the open arms facing away from the fluid path defined by annular groove 3. In this embodiment this is radially inwardly of the connector in contrast to the arrangement of the embodiments described above where the arms face radially outwardly (but still away from the fluid path).

These sealing rings seal the production fluid against leakage in the clearance between relatively moveable surface 4,5 below the groove 3 and between surfaces 6 and 7 above. They are thus known as dynamic seals. They are activated by pressurised barrier fluid applied through channels 44 to the open side to create a pressure differential.

Roller bearings 65 are provided to assist the relative movement between surfaces 4 and 5 and between surfaces 6 and 7. Sliding or needle bearings 66 assist movement between facing vertical surfaces.

Static seals 28 comprising O-rings 19 and back-up plates 20 are also used in the connector as shown, but these are used between surfaces which have a fixed relationship to each other. These static seals may alternatively comprise U-shaped lip seals pressurised by barrier fluid supplied through drilled communication channels.

Environment seals 34,35 are arranged above and below each section of connector.

What I claim is:

1. A connecting arrangement for conduits carrying high pressure production fluid, the arrangement comprising:
   a first member carrying a connecting end of one of the conduits, and having an outwardly facing surface,
   a second member arranged coaxially with and surrounding the first member and carrying a connecting end of another of the conduits, the second member having a surface facing the outwardly facing surface of the first member, the first and the second members being rotatable relative to each other,
   wherein the first connecting member has:
     a central core with a plurality of bores formed longitudinally therein,
     a plurality of passages formed radially of the core, each radial passage communicating with a respective longitudinal bore,
     a plurality of annular grooves on the outwardly facing surface, each annular groove providing a fluid flow path to a respective radial passage in the central core, and
     wherein the central core includes an inner and an outer core element concentrically arranged one with the other, the bores and radial passages of the first core element being independent, with respect to the flow of production fluid, from the bores and radial passages of the second core element,
   and wherein the second member has a plurality of corresponding annular grooves in its inwardly facing surface, respective pairs of the annular grooves in the first and second members forming fluid flow annular channels,
   and means for sealing the or each annular channel against leakage of the high pressure production fluid,
   wherein the sealing means includes:
     a U-shaped sealing member activated by differential pressure, and
     means for supplying a barrier fluid at a higher pressure than the production fluid to the side of the sealing member which is remote from the production fluid flow.

2. The arrangement of claim 1 further comprising additional environment seals located in the region of the top and bottom of the central core.

3. The arrangement of claim 1 wherein the longitudinal bores are formed in a ring concentrically within the core.

4. The arrangement of claim 1, wherein the inner core element extends longitudinally beyond the outer core element and two second connecting members having different diameters are provided to connect respectively with the inner and outer core elements.

5. The arrangement of claim 1 wherein the central core comprises stainless steel.

6. The arrangement of claim 1 wherein the central core has a hollow section extending axially therethrough.

7. The arrangement of claim 6 comprising:
   an additional first connecting member having a smaller diameter than that of the first connecting member and which is stacked therein so that the longitudinal bores of the additional first connecting member fluidly communicate with the hollow section of the first member.

8. The arrangement of claim 7 comprising a plurality of pipes in the hollow section which connect hydraulically to the bores of the additional first connecting member.

9. The arrangement of claim 6 comprising a plurality of first connecting members and co-operating second connecting members, of differing diameters, the members being stackable to be used together.

10. A connecting arrangement for conduits carrying high pressure production fluid, the arrangement comprising:
    a first member carrying a connecting end of one of the conduits, and having an outwardly facing surface,
    a second member carrying a connecting end of the other of the conduits, the second member having a surface facing the outwardly facing surface of the first member, the first and the second members being movable relative to each other,
    wherein the first connecting member has:
      a central core with a plurality of bores formed longitudinally therein; and
      a plurality of passages formed radially of the core, two of said longitudinal bores communicating with each of said radial passages,
      a plurality of annular channels defined by said facing surfaces of the connecting members, each annular channel providing a fluid flow path to a respective radial passage in the central core,
    and means for sealing the or each annular channel against leakage of the high pressure production fluid,
    wherein the sealing means includes:
      a sealing member activated by differential pressure, and
      means for supplying a barrier fluid to the side of the sealing member which is remote from the production fluid flow.

* * * * *